(12) United States Patent
Alvarez et al.

(10) Patent No.: US 11,950,117 B2
(45) Date of Patent: Apr. 2, 2024

(54) LARGE SCALE RADIO FREQUENCY SIGNAL INFORMATION PROCESSING AND ANALYSIS SYSTEM

(71) Applicant: Aurora Insight Inc., Denver, CO (US)

(72) Inventors: Jennifer Alvarez, Westminster, CO (US); Benjamin Kempke, Ann Arbor, MI (US); Wyatt Tyree, Denver, CO (US); Michael Skaug, Boulder, CO (US)

(73) Assignee: Aurora Insight Inc., Denver, CO (US)

( * ) Notice: Subject to any disclaimer, the term of this patent is extended or adjusted under 35 U.S.C. 154(b) by 0 days.

(21) Appl. No.: 17/956,521

(22) Filed: Sep. 29, 2022

(65) Prior Publication Data

US 2023/0086604 A1 Mar. 23, 2023

Related U.S. Application Data

(63) Continuation of application No. 17/003,016, filed on Aug. 26, 2020, now Pat. No. 11,546,784, which is a continuation of application No. 16/808,327, filed on Mar. 3, 2020, now Pat. No. 10,798,598, which is a continuation of application No. 16/384,621, filed on Apr. 15, 2019, now Pat. No. 10,582,401, which is a continuation-in-part of application No. 15/991,540, (Continued)

(51) Int. Cl.
  *H04W 24/08* (2009.01)
  *G06N 20/00* (2019.01)
  *H04B 17/309* (2015.01)
  *H04W 64/00* (2009.01)

(52) U.S. Cl.
  CPC ............ *H04W 24/08* (2013.01); *G06N 20/00* (2019.01); *H04B 17/309* (2015.01); *H04W 64/003* (2013.01)

(58) Field of Classification Search
  CPC ... H04W 24/08; H04W 64/003; H04W 52/42; H04W 52/225; G06N 20/00; H04B 17/309; H04L 41/147; H04L 41/149; H04L 41/16; H04L 43/024
  See application file for complete search history.

(56) References Cited

U.S. PATENT DOCUMENTS 7,035,311 B2 *  4/2006  Nohara .................... H04K 3/82
                                                           455/150.1
7,126,528 B2  10/2006  Alvarez et al.
(Continued)

*Primary Examiner* — Md K Talukder
(74) *Attorney, Agent, or Firm* — Sughrue Mion, PLLC

(57) ABSTRACT

A large-scale radio frequency signal information processing and analysis system that provides advanced signal analysis for telecommunication applications, including band capacity and geographical density determinations and detection, classification, identification, and geolocation of signals across a wide range of frequencies and across broad geographical areas. The system may utilize a range of novel algorithms for bin-wise processing, Rayleigh distribution analysis, telecommunication signal classification, receiver anomaly detection, transmitter density estimation, transmitter detection and location, geolocation analysis, telecommunication activity estimation, telecommunication utilization estimation, frequency utilization estimation, and data interpolation.

14 Claims, 22 Drawing Sheets

Related U.S. Application Data filed on May 29, 2018, now Pat. No. 10,338,118, and a continuation-in-part of application No. 15/585,102, filed on May 2, 2017, now Pat. No. 10,684,347.

(60) Provisional application No. 62/656,781, filed on Apr. 12, 2018.

(56) References Cited

U.S. PATENT DOCUMENTS

| | | | |
|---|---|---|---|
| 8,780,968 B1 * | 7/2014 | Garcia | H04W 16/14 |
| | | | 375/228 |
| 8,892,050 B2 * | 11/2014 | Shellhammer | H04B 17/318 |
| | | | 455/67.11 |
| 9,191,993 B2 | 11/2015 | Wala | |
| 9,460,564 B2 | 10/2016 | Six et al. | |
| 9,628,201 B2 | 4/2017 | Rauma et al. | |
| 10,122,479 B2 * | 11/2018 | Dzierwa | H04B 17/391 |
| 10,231,206 B2 * | 3/2019 | Dzierwa | H04B 17/23 |
| 10,271,233 B2 * | 4/2019 | Kleinbeck | H04B 17/29 |
| 10,310,079 B1 * | 6/2019 | Um | G01S 15/04 |
| 10,459,020 B2 * | 10/2019 | Dzierwa | G08B 29/185 |
| 10,506,526 B2 | 12/2019 | Abdelmonem et al. | |
| 10,560,940 B2 | 2/2020 | Calin et al. | |
| 10,700,943 B2 | 6/2020 | Ahlport et al. | |
| 2006/0062363 A1 * | 3/2006 | Albrett | H04N 21/4532 |
| | | | 348/E7.071 |
| 2007/0105502 A1 * | 5/2007 | Agarwal | G01S 19/21 |
| | | | 455/63.1 |
| 2009/0225887 A1 | 9/2009 | Sutton | |
| 2017/0237484 A1 * | 8/2017 | Heath | H04B 10/07953 |
| | | | 398/26 |
| 2019/0150019 A1 | 5/2019 | Saito et al. | |
| 2019/0150130 A1 | 5/2019 | Yang et al. | |
| 2019/0150158 A1 | 5/2019 | Farmanbar et al. | |
| 2023/0086604 A1 * | 3/2023 | Alvarez | G06N 20/00 |
| | | | 455/66.1 |
| 2023/0088290 A1 * | 3/2023 | Mengwasser | H04W 64/003 |
| | | | 455/66.1 |

\* cited by examiner

Bin-Wise Processing 700

701 Create data bins using using transforms such as the Fourier transform (and its various implementations such as fast Fourier transform (FFT) or discrete Fourier transform (DFT)), wavelet transform, discrete cosine transform, or similar.

702 Average or sum the values in a given frequency bin over a number of frequency domain samples to reduce the variance in the signals and noise levels, allowing low or negative signal to noise ratio (SNR) energy detection.

703 Find the mean or median value in each frequency bin over a number of frequency domain samples to overcome the effects of a signal that is significantly stronger or weaker than the average.

704 Find the maximum and/or minimum value in each frequency bin over a number of frequency domain samples to resolve signals that are continuously present and signals that are intermittent in time.

705 Find the mean, median, maximum, minimum, variance, skew, and kurtosis values, plus the time component for a bin or set of bins in a geographical area, and compare each statistic to the same statistic computed for that bin or set of bins over a large area to identify deviations, identify anomalies, and distinguish signals from noise.

706 Perform bin-by-bin processing of average, median, maximum, minimum, standard deviation, variance, skew, kurtosis, and/or other statistical values over a number of transform-domain samples, to reduce the quantity of data in results and expedite processing.

707 Adjust the number of frequency domain samples used in the average, median, minimum, and maximum to increase or decrease time resolution to aid in signal detection.

708 Combine frequency bins using a maximum value search to reduce data quantity while detecting the presence of signals.

709 Combine or drop the frequency domain samples (e.g., FFTs) over time using the mean value to reduce noise, enabling more effective detection of signals.

Fig. 7

Rayleigh Distribution Analysis 800

801 Find the Rayleigh distribution of in-phase and quadrature-phase samples from the signal information.

802 Compare the Rayleigh distribution of signals over a frequency band of interest against noise distribution.

803 Apply thresholds to isolate synthetic signals.

Fig. 8

Telecommunication Signal Classification 900

901 Use image processing algorithms in multiple frequency and time resolutions to produce compact datasets.

902 Use the compact datasets to train machine learning algorithms to detect, identify, and classify telecommunication signals.

903 Apply machine learning to future datasets in live signal data to refine thresholds for other algorithms and to improve signal processing results.

Fig. 9

Receiver Anomaly Detection 1000

1001 Calculate a Kurtosis value of the amplitude of a given signal for a given receiver.

1002 Compare the Kurtosis value to a subsequent signal from the same receiver.

1003 Apply thresholds to determine whether the subsequent signal is an anomalous signal.

1004 Discard spurious signals, aliased signals, and/or signals that are saturating a receiver without contributing additional useful data in order to reduce sensor load and improve operations on radio frequency signals, thereby reducing the total amount of data to be processed and cleaning up datasets.

Fig. 10

Transmitter Density Estimation 1100

1101 Map signal strength data across a geographical area.

1102 Survey a portion of the geographical area.

1103 Count the number of transmitters in the survey.

1104 Correlate the number of transmitters with signal strength data to estimate transmitters per signal strength.

1105 Apply estimate to the remaining geographical area.

Fig. 11

Transmitter Detection & Location 1200
1201 Examine multiple signal samples taken from different times or look angles at a given frequency or frequencies.
1202 Examine signals across multiple frequencies or groups of frequencies.
1203 Correlate signals in a given geographical area to determine whether a transmitter location has been identified.
Fig. 12

Geolocation Analysis 1300

1301 Receive signal information.

1302 If the transmitter time of transmission is known, for each signal:
  calculate the time of flight;
  translate the time of flight into a range value at each sensor or observation location; and
  calculate multilateral location from intersection of range values.

1303 If the transmitter time of transmission is not known, for each signal:
  use multiple signal observations to calculate the time of arrival, irrespective of the start of transmission being an unknown;
  translate the time of arrival into a range value at each sensor; and
  calculate multilateral location from intersection of range values.

Fig. 13

Geolocation Analysis (Alternate Method) 1400

1401 Receive signal information.

1402 Determine the best location estimate based on highest received signal power.

1403 Examine detected signal power and the geographical extent over which the signal is observed to determine the error associated with this estimate of best location.

Fig. 14

Frequency Utilization Estimation 1700

1701 Where a frequency band has been defined, use machine learning algorithms to identify clustering of frequencies.

1702 Where a frequency band has not been defined, use a convolutional filter tuned in time and frequency characteristics to a specific signal type, and convolve the filter over a large time-frequency space, using peaks of the result to identify a signal or signals of interest, from which utilization over the larger frequency can be estimated.

Fig. 17

LARGE SCALE RADIO FREQUENCY SIGNAL INFORMATION PROCESSING AND ANALYSIS SYSTEM

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/003,016
Ser. No. 16/808,327
Ser. No. 16/384,621
Ser. No. 15/991,540
62/656,781
Ser. No. 15/585,102
62/305,513

BACKGROUND

Field of the Art

The disclosure relates to the field of telecommunication and more particularly to the field of advanced radio frequency signal information processing and analysis for telecommunications and other applications.

Discussion of the State of the Art

Most wireless telecommunication requires transmission and reception of radio frequency (radio frequency signal) signals in the radio frequency signal spectrum from frequencies of about 3 kHz to frequencies of about 300 GHz. Mobile, backhaul, consumer, fixed station, and public safety communications, to name a few, rely on frequencies in the radio frequency signal spectrum that are assigned, or allocated, for a particular use. Further, certain frequency bands are licensed to particular users in specified geographical areas.

Due to the proliferation of wireless communication applications, frequency bands for wireless communication in the radio frequency signal spectrum are becoming congested. Efforts continue to be made to increase the efficiency of frequency usage by consolidating and assigning unused or minimally used frequencies, and by reallocating frequencies for use as demand dictates. Additionally, transmitter output power is being reduced to limit the effective area of a transmitted signal so that frequencies can be reused based on geographical diversity. Consumer demand and trends towards high-data rate communications, which requires the use of increasing bandwidth and efficient transmissions methods, drive these innovations. As the complexity of wireless systems naturally increases to support more users in discrete bands, better systematic knowledge of the spectrum environment is needed to ensure proper operation. Indeed, proposed approaches such as dynamic spectrum allocation and cognitive radio techniques for spectrum sharing, to further enhance efficiency of spectrum use, require good knowledge of the spectral environment.

What is needed is a system for analyzing the radio frequency landscape across a broad range of frequencies and over a variety of geographical areas.

SUMMARY

Accordingly, the inventor has conceived and reduced to practice, a large-scale radio frequency signal information processing and analysis system that provides advanced signal analysis for telecommunication applications, including band capacity and geographical density determinations and detection, classification, identification, and geolocation of signals across a wide range of frequencies and across broad geographical areas. The system may utilize a range of novel algorithms for bin-wise processing, Rayleigh distribution analysis, telecommunication signal classification, receiver anomaly detection, transmitter density estimation, transmitter detection and location, geolocation analysis, telecommunication activity estimation, telecommunication utilization estimation, frequency utilization estimation, and data interpolation.

According to a preferred embodiment, a method for detecting, quantifying the activity of, and identifying the type of telecommunication signals is disclosed, comprising the steps of: receiving signal information; finding the distribution of power samples within a frequency band of interest; distinguishing the power samples from noise by comparing to a Rayleigh distribution derived from power values in a noise frequency band; determining if a signal is present by applying thresholds to isolate signals; for each signal, estimating the time that the signal is above a threshold, or estimating the frequency of occurrences where the signal energy is above the threshold, or both; correlating the distribution within the frequency band versus the capacity of the band to determine the prevalence of telecommunication activity; using a machine learning algorithm applied to digitized spectrum data of the signal information in the time domain, frequency domain, or both, to identify the presence of known signal types within a frequency range.

According to an aspect of an embodiment, the machine learning algorithm is applied to time-frequency domain data to identify the presence of known signal types within a frequency range.

According to an aspect of an embodiment, the machine learning algorithm is applied to bin-wise statistics to identify the presence of known signal types within a frequency range.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 7 is a flow diagram illustrating an exemplary algorithm for bin-wise processing, according to an aspect of an embodiment.

FIG. 8 is a flow diagram illustrating an exemplary algorithm for a Rayleigh distribution analysis, according to an aspect of an embodiment.

FIG. 9 is a flow diagram illustrating an exemplary algorithm for telecommunication signal classification, according to an aspect of an embodiment.

FIG. 10 is a flow diagram illustrating an exemplary algorithm for receiver anomaly detection, according to an aspect of an embodiment.

FIG. 11 is a flow diagram illustrating an exemplary algorithm for transmitter density estimation, according to an aspect of an embodiment.

FIG. 12 is a flow diagram illustrating an exemplary algorithm for transmitter detection and location, according to an aspect of an embodiment.

FIG. 13 is a flow diagram illustrating an exemplary algorithm for geolocation analysis, according to an aspect of an embodiment.

FIG. 14 is a flow diagram illustrating an exemplary algorithm for geolocation analysis using an alternate method, according to an aspect of an embodiment.

FIG. 17 is a flow diagram illustrating an exemplary algorithm for frequency utilization estimation, according to an aspect of an embodiment.

DETAILED DESCRIPTION

Figure 1:
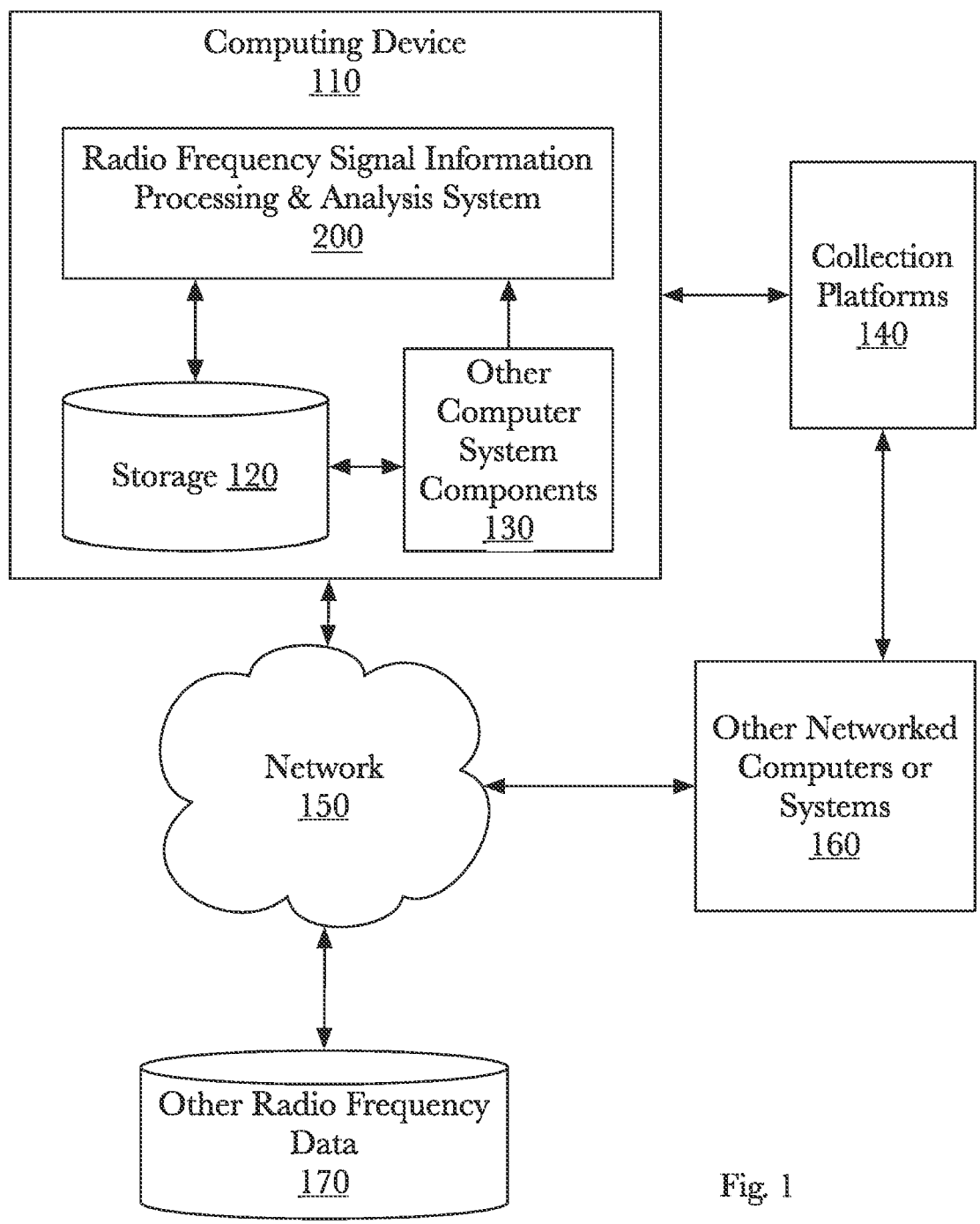
FIG. 1 is a block diagram illustrating an exemplary system architecture overview, according to an embodiment.

The inventor has conceived, and reduced to practice, a large-scale radio frequency signal information processing and analysis system that provides advanced signal analysis for telecommunication applications, including band capacity and geographical density determinations and detection, classification, identification, and geolocation of signals across a wide range of frequencies and across broad geographical areas. The system may utilize a range of novel algorithms for bin-wise processing, Rayleigh distribution analysis, telecommunication signal classification, receiver anomaly detection, transmitter density estimation, transmitter detection and location, geolocation analysis, telecommunication activity estimation, telecommunication utilization estimation, frequency utilization estimation, and data interpolation.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Collection platform" or "platform" as used herein refers to a surface, structure, vehicle, portable electronic device, or other object on which a sensor system may be mounted, in which a sensor system may be placed, or into which a sensor system may be integrated. Collection platforms may take a variety of forms, including, but not limited to fixed objects (e.g. desks, windows, towers, buildings, billboards, etc.), portable objects (backpacks, mobile phones, etc.), vehicles (cars, trucks, boats, etc.), small scale aircraft (e.g., drones, model airplanes, etc.), aircraft (airplanes, helicopters, etc.), balloons (hot-air balloons, weather balloons, etc.), and satellites.

"Landscape" or "radio frequency landscape" as used herein means the totality of radio frequency signal activity in a given area, including, but not limited to, signal times, signal locations, signal directions, signal altitudes, signal sources, signal frequencies, signal powers, areas of good reception, and areas of poor reception, and may include non-signal information such as the identification of individuals or companies emitting signals.

"Radio frequency" as used herein means frequencies from about 3 kilohertz (3 kHz) to about 300 gigahertz (300 GHz).

"Radio frequency data" means any data associated with a radio frequency signal.

"Radio frequency signal" as used herein means any detectable radio frequency signals with a frequency or frequencies from about 3 kilohertz (3 kHz) to about 300 gigahertz (300 GHz).

"Sensor system" as used herein means a system capable of receiving radio frequency signals. Although some of the embodiments herein assume a complex sensor system such as a software-defined radio capable of detecting, receiving, processing, and storing radio frequency signals, the term sensor system is not so limited, and includes any system capable of receiving radio frequency signals from simple wire antenna receivers to sophisticated systems with directional antennas and complex circuitry.

"Signal" as used herein means radio frequency signal unless the context indicates otherwise.

"Signal information" or "signal data" means any information associated with or used to describe a signal. This may include radio frequency data and/or metadata describing the radio frequency data (for example, information about the sensor system and collection platform configuration, the area over which radio frequency data was collected, the time at which data was collected, look-angles of the sensor system or collection platform, operating characteristics of the sensor system or collection platform, including but not limited to, location, speed, orientation, movement relative to Earth, movement relative to other sensor systems, frequencies of operation, calibration data, times of operation, etc.), inputs from other algorithms, and/or inputs from other sources of information (for example, a database or list of cellular base station locations). Signal information may be from one or more geographical locations or times.

"Telecommunication signal" or "telecom signal" means any radio frequency signal carrying information intended to convey a message. Telecommunication signals may be analog or digital. Although telecommunication signals are frequently associated with mobile phones and mobile phone companies, the term as used herein is broader, and encompasses any form of synthetic radio frequency signal intending to convey information, including, but not limited to, radio, television, mobile phone, WiFi, Bluetooth, or other such transmission.

Conceptual Architecture

FIG. 1 is a block diagram illustrating an exemplary system architecture overview 100, according to an embodiment. In this overview, a radio frequency signal information processing and analysis system 200 is shown in relation to an array of related computing devices and network components. For example, the radio frequency signal information processing and analysis system 200 may be located on a computing device 110 which has data storage 120 and other computer system components 130. The computing device 110 may be connected to a plurality of collection platforms 140 that gather radio frequency signal information for processing and analysis. The computing device 110 may also be connected to a network 150 comprising other networked computers or systems 160, including but not limited to the internet, and to a variety of networked sources of radio frequency signal information 170. This exemplary system architecture by no means restricts the architecture or configuration of the invention, and a person of ordinary skill in the art will understand that the invention may be implemented using a variety of computer components, computing devices, and network connections.

Figure 2:
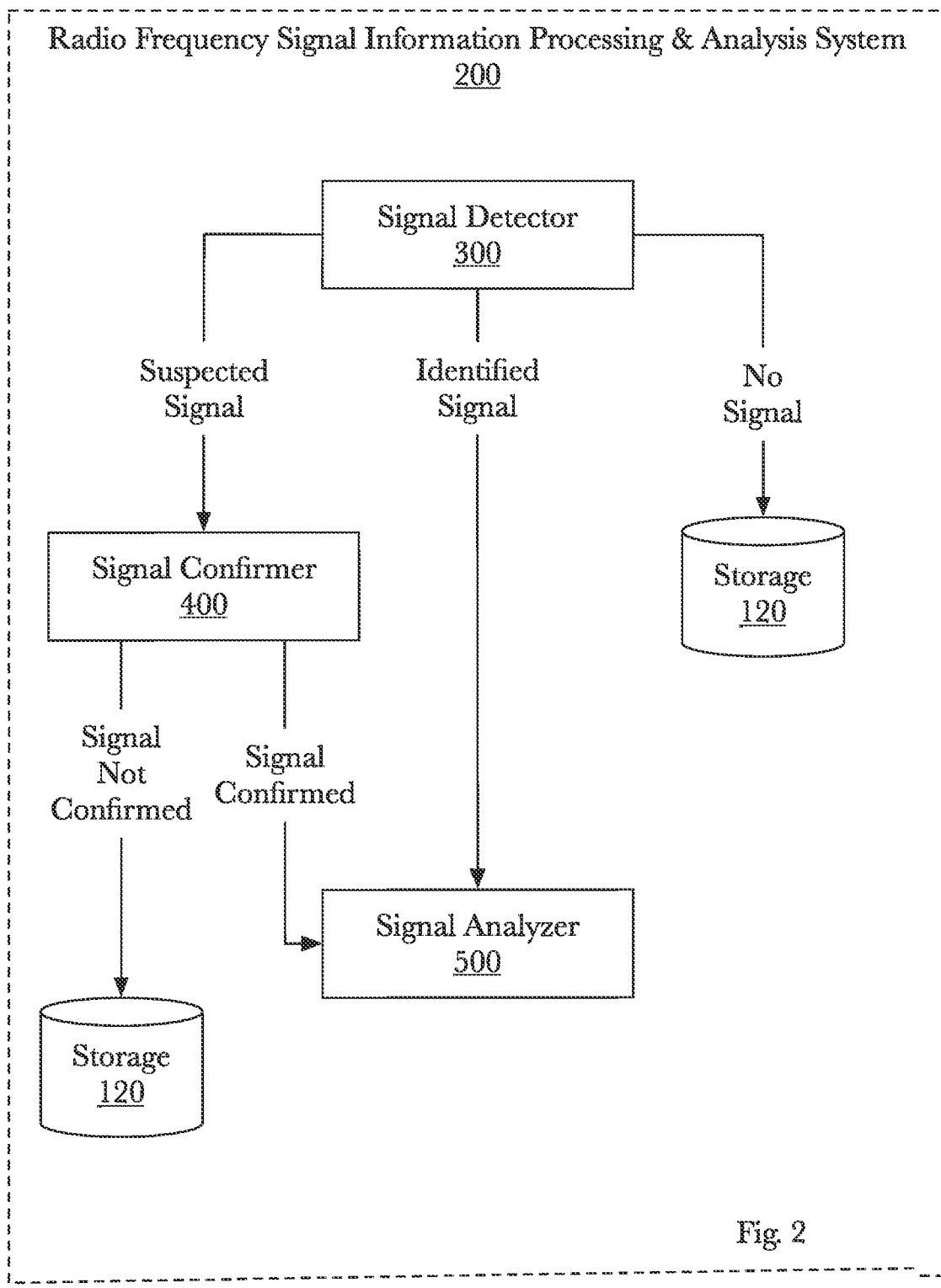
FIG. 2 is a block diagram illustrating an exemplary radio frequency signal information processing and analysis system, according to a preferred embodiment.

FIG. 2 is a block diagram illustrating an exemplary radio frequency signal information processing and analysis system 200, according to a preferred embodiment. In this embodiment, the radio frequency signal information processing and analysis system 200 comprises a signal detector 300, a signal confirmer, and a signal analyzer 400. The signal detector 300 receives radio frequency signal information and analyzes it using one or more algorithms to detect possible signals within the data. For portions of the data in which a signal is detected, that portion of the data is forwarded directly to the signal analyzer 500. For portions of the data in which no signal is detected, that portion of the data is sent to storage 120 or discarded. For portions of the data in which a signal is suspected, but where there may be questions about the validity of the signal, that portion of the data is forwarded to the signal confirmer 400 for further analysis. The signal confirmer 400 receives radio frequency signal information comprising suspected signals and analyzes it using one or more algorithms to confirm the existence of suspected signals within the data. For portions of the data in which the existence of a signal is confirmed, that portion of the data is forwarded to the signal analyzer 500. For portions of the data in which the existence of a signal is not confirmed, that portion of the data is sent to storage 120 or discarded. The signal analyzer 500 receives radio frequency signal information comprising at least one detected or confirmed signal, and analyzes it using one or more algorithms designed to provide information about the radio frequency signal landscape.

Figure 3:
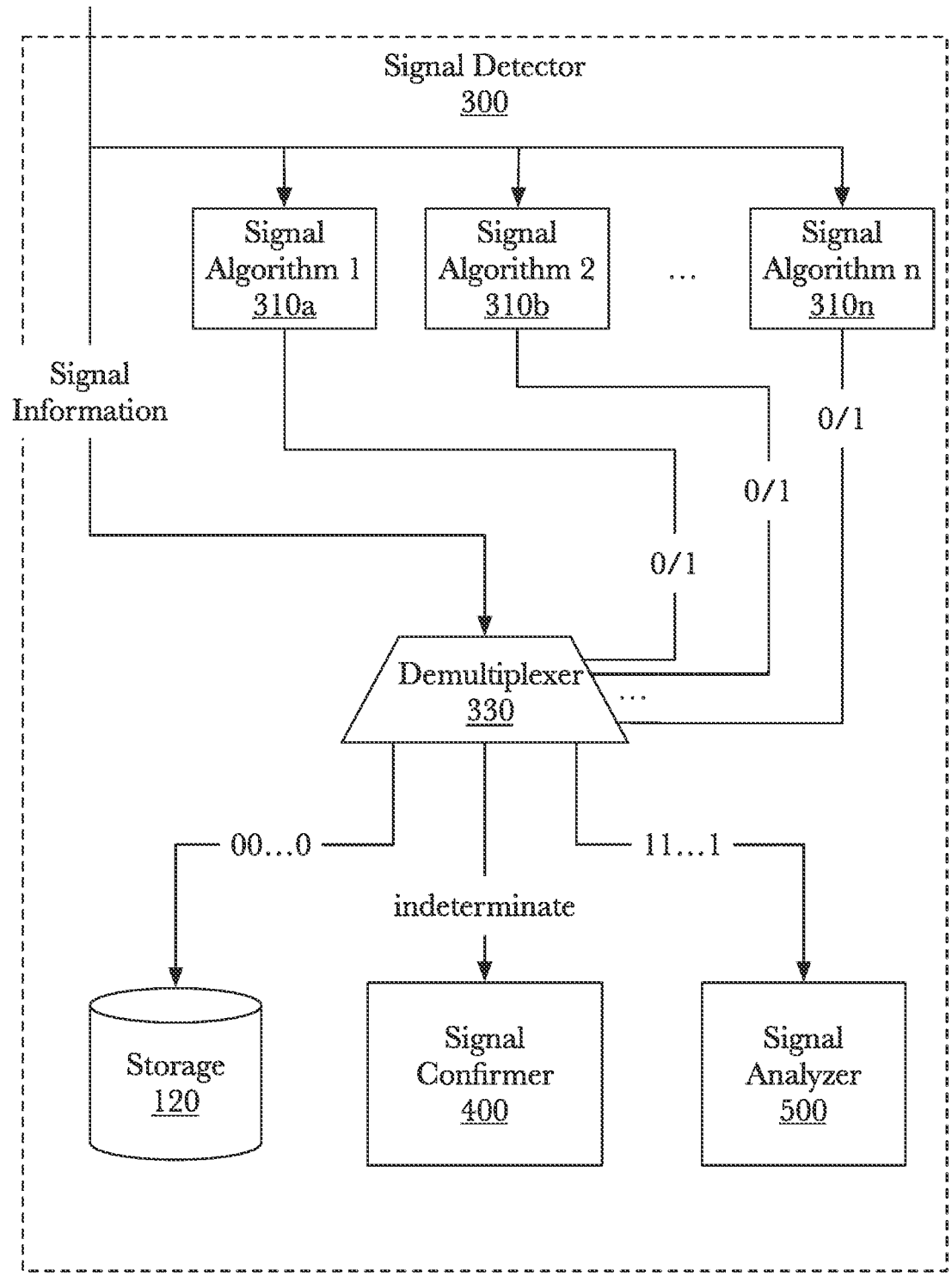
FIG. 3 is a block diagram illustrating an exemplary signal detector, according to an aspect of a preferred embodiment.

FIG. 3 is a block diagram illustrating an exemplary signal detector 300, according to an aspect of an embodiment. As signal information is received by the signal detector 300, it is distributed to a demultiplexer 330 and one or more signal algorithms 310a-n. Each signal algorithm analyzes the data and outputs a result indicating whether a signal was detected (1) or not detected (0). The output of each algorithm 310a-n is passed to a demultiplexer 330, which, depending on the consensus of the algorithms 310a-n routes the radio frequency signal information to storage 120, to the signal confirmer 400, or to the signal analyzer 500. In this embodiment, routing to storage 120 occurs where there is a unanimous consensus of the algorithms 310a-n that there is no signal (00 . . . 0), routing to the signal analyzer occurs when there is unanimous consent of the algorithms 310a-n that a signal has been detected (11 . . . 1), and routing to the signal confirmer 400 occurs when there is no unanimous consensus of the algorithms as to the detection of a signal (indeterminate). However, a person of ordinary skill in the art will recognize that unanimity of consensus is not required, and that the routing of the data may be based on any combination of outputs from the one or more algorithms 310a-n, including but not limited to a majority consensus, minority consensus, or even a single indication of the existence of a signal. Further, although this embodiment shows a particular hardware configuration using a demultiplexer 330, a person of ordinary skill in the art will recognize that many configurations of hardware, software, or both, may accomplish the same functionality.

Figure 4:
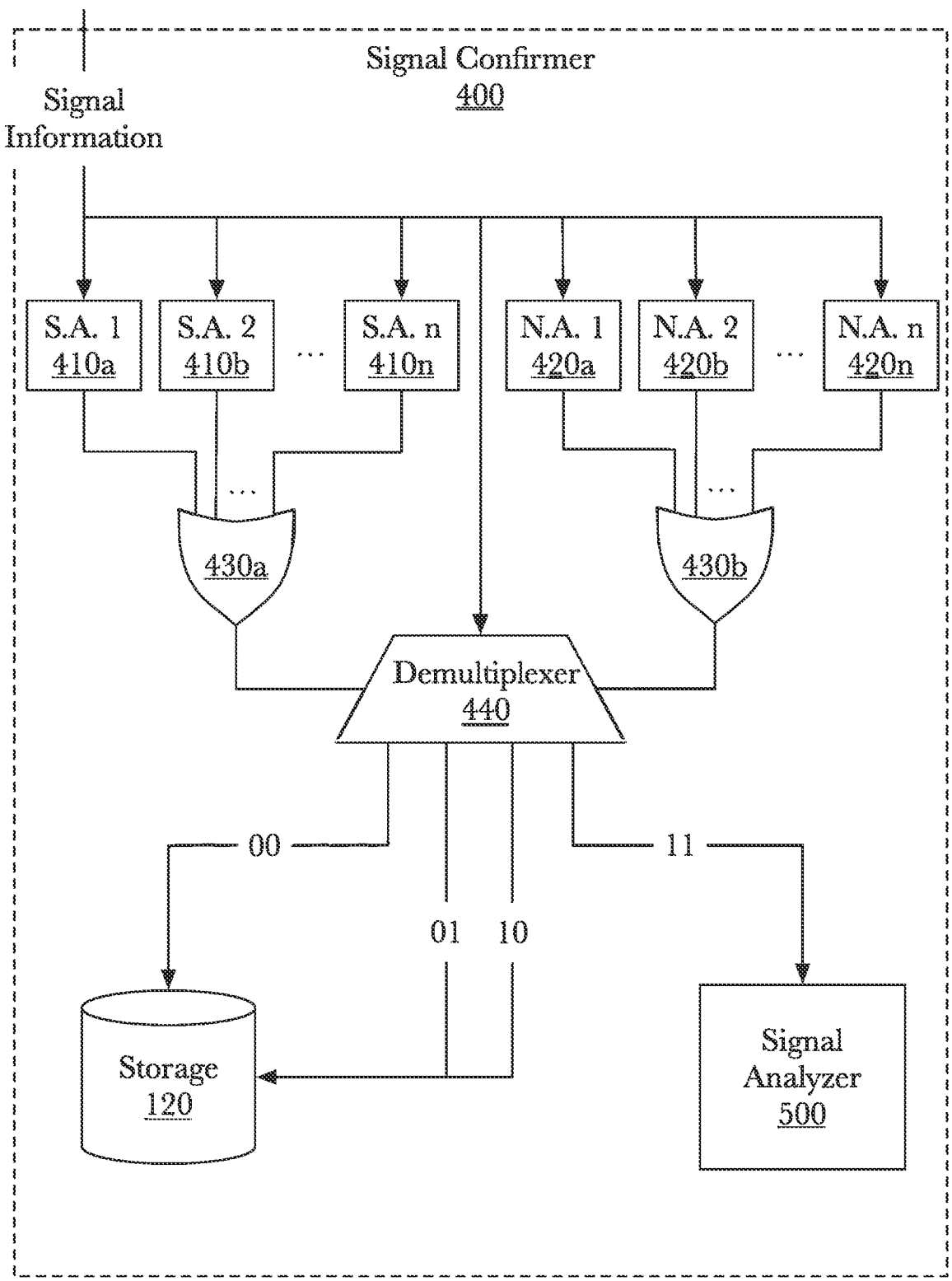
FIG. 4 is a block diagram illustrating an exemplary signal confirmer, according to an aspect of an embodiment.

FIG. 4 is a block diagram illustrating an exemplary signal confirmer 400, according to an aspect of an embodiment. As a portion of radio frequency signal information comprising at least one suspected signal is received by the signal confirmer 300, it is distributed to a demultiplexer 440 and one or more signal algorithms 410a-n and one or more noise algorithms 420a-n. In this embodiment, the signal algorithms 410a-n act as positive indicators of the existence of a signal and the noise algorithms 420a-n act as negative indicators of the existence of a signal. Each signal algorithm 410a-n analyzes the data and outputs a result indicating whether a signal was confirmed (1) or not confirmed (0). Each noise algorithm 420a-n analyzes the data and outputs a result indicating whether the portion of data is noise (0) or not noise (1). The output of the set of signal algorithms 410a-n is passed to an OR logic gate 430a, which outputs a confirmation of signal (1) if any one of the signal algorithms 410a-n confirms the existence of a signal, and a non-confirmation (0) otherwise. The output of the set of noise algorithms 420a-n is passed to another OR logic gate 430b, which outputs a confirmation of signal (1) if any one of the noise algorithms 410a-n indicates that the portion of data is not noise (1), and a non-confirmation (0) otherwise. The output of the two OR logic gates 430a-b is passed to a demultiplexer 440, which passes through the data to the signal analyzer 500 in case of a consensus (11) of the OR logic gates that a signal is confirmed. Otherwise, the data are sent to storage 120 or discarded. In this embodiment, sets of algorithms are used to represent positive indicators and negative indicators of signal confirmation, and the logical conjunction (AND) of the logical disjunction (OR) of the results of each set of indicators is used to determine whether a signal is confirmed. However, a person of ordinary skill in the art will recognize that this particular logical combination is not required, and that the confirmation of the signal may be based on any combination of outputs from any combination of the algorithms 410a-n, 420a-n, including but not limited to a majority consensus, minority consensus, or even a single indication of the existence of a signal from a single algorithm. Further, although this embodiment shows a particular hardware configuration using a demultiplexer 440, a person of ordinary skill in the art will recognize that many configurations of hardware, software, or both, may accomplish the same functionality.

Figure 5:
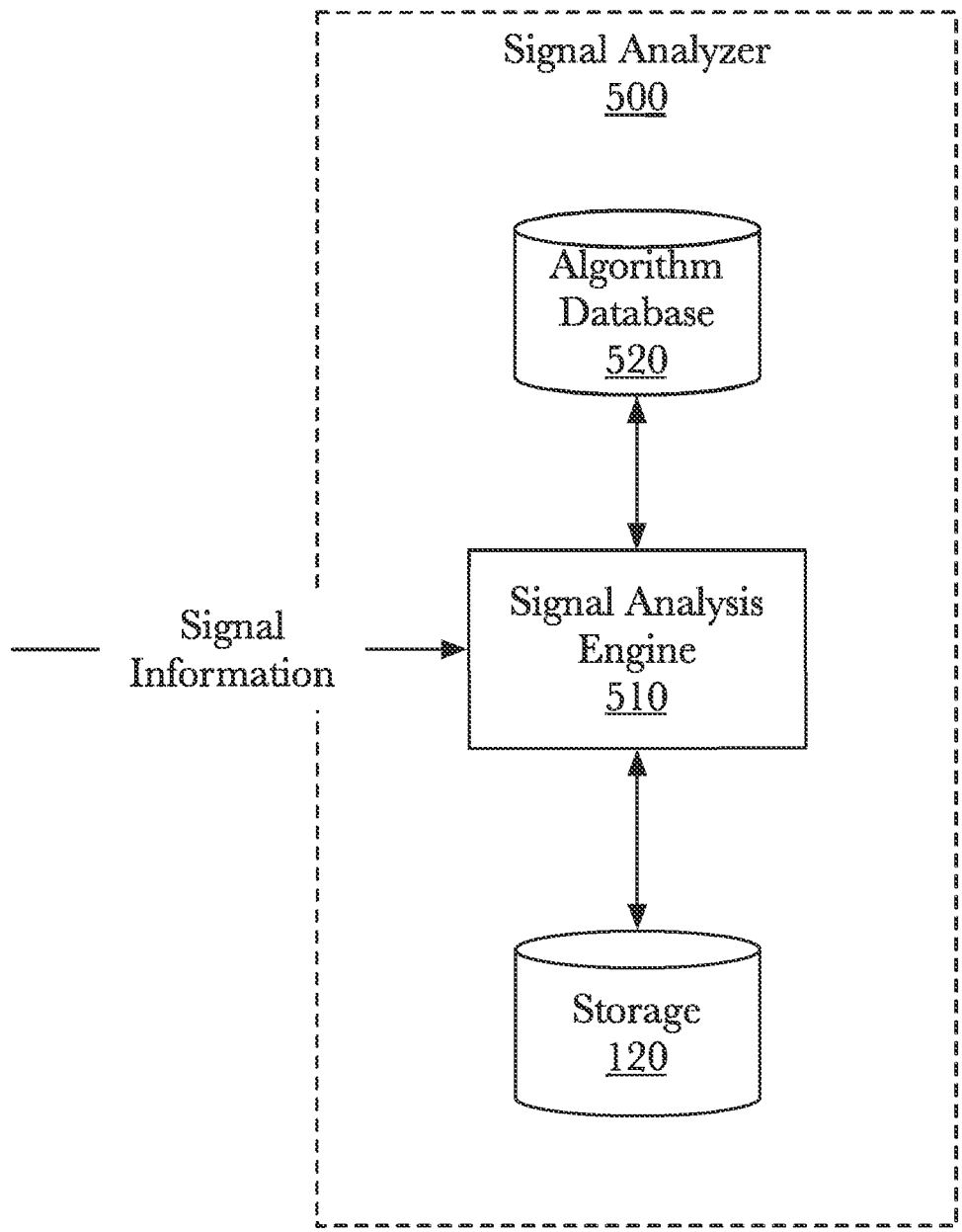
FIG. 5 is a block diagram illustrating an exemplary signal analyzer, according to an aspect of an embodiment.

FIG. 5 is a block diagram illustrating an exemplary signal analyzer 500, according to an aspect of an embodiment. A signal analysis engine 510 receives signal information from the signal detector 300 and/or from the signal confirmer 400 and analyzes the signal information using one or more algorithms, which may be stored in an algorithm database 520. A person of ordinary skill in the art will recognize that the algorithms may comprise a variety of forms, and that a separate database of algorithms is just one possible form. The algorithms used will depend on the type or types of analyses required for a given purpose, and may include, but are not limited to bin-wise processing, Rayleigh distribution analysis, telecommunication signal classification, receiver anomaly detection, transmitter density estimation, transmitter detection and location, geolocation analysis, telecommunication activity estimation, telecommunication utilization estimation, frequency utilization estimation, and data interpolation. Each of these algorithms is described in further detail below. The results of the analyses may be stored in data storage 120. Machine learning algorithms may also be used in conjunction with, or as part of, these described algorithms.

Some or all of the above-described processing steps may be performed in parallel, either on the same radio frequency signal sample data or on duplicate copies of the original data (that may then be recombined after processing). The system is not limited by the components described, and may include other components, such as signal filters, and additional processing steps such as transforms (fast Fourier transform, wavelet transform, discrete cosine transform, or other related transforms), and additional statistical analyses such as calculation of the mean, median, maximum, minimum, standard deviation, variance, skew, kurtosis, and/or other statistical value of a signal's amplitude, or the log of the amplitude, or of the power in each frequency domain sample.

Figure 6:
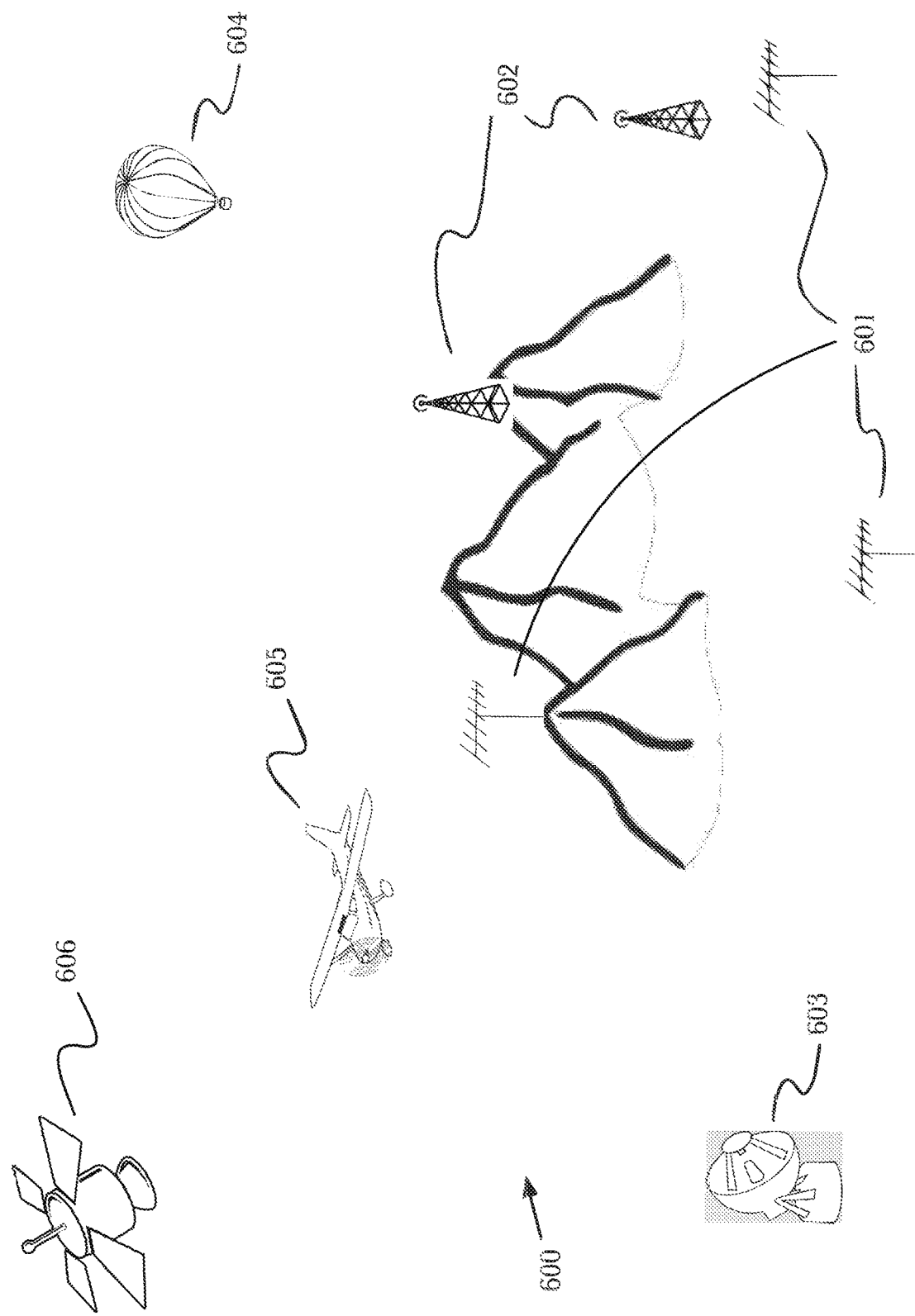
FIG. 6 is a diagram illustrating a variety of sensor systems and collection platforms for gathering radio frequency signal data.

FIG. 6 is a diagram illustrating a variety 600 of sensor systems and collection platforms for gathering radio frequency signal information. A radio frequency signal information processing and analysis system 200 would be most effective if a broad range of digital radio frequency signal information is collected from a variety of sensor systems and collection platforms with different characteristics. Ideally, the array of sensor systems and collection platforms would comprise a plurality of mobile collection platforms and stationary collection platforms, with each collection platform wherein one of the algorithms used in the is one or more sensor systems. For example, stationary collection platforms may be any ground-based structure such and building or towers, and ideally would be located in geographically diverse locations, and at different altitudes, and with different lines of sight. Ground-based mobile collection platforms (not shown) may be mobile phones or vehicle-mounted. Aerial collection platforms may comprise satellites 606, airplanes 605, cars, or balloons 604, each of might collect data using different instrumentation, from different altitudes, and along different flight paths. Antenna types used by the sensor systems on all collection platforms may comprise directional antennas 601, 603 or non-directional antennas 602.

Detailed Description of Exemplary Aspects

FIG. 7 is a flow diagram illustrating an exemplary algorithm for bin-wise processing 700, according to an aspect of an embodiment. Data "bins" are created by using transforms such as the Fourier transform (and its various implementations such as fast Fourier transform (FFT) or discrete Fourier transform (DFT)), wavelet transform, discrete cosine transform, or other related transforms 701. In a given frequency bin, the values are averaged or summed over a number of transform-domain samples to reduce the variance in the signals and noise levels and thereby allow for low or negative signal-to-noise ratio (SNR) radio frequency signal detection 702. A mean or median value, or other statistical measure in each bin may be determined over a number of transform-domain samples to overcome the effects of a signal that is significantly stronger or weaker than the average 703. A maximum and/or minimum value, standard deviation, variance, or other statistical measure in each bin over a number of transform-domain samples may be determined and used to resolve signals that are continuously present and signals that are intermittent in time 704. Processing may also find the mean, median, maximum, minimum, standard deviation, variance, skew, kurtosis, entropy, and/or other statistical measures, plus the time component for a bin or set of bins in a geographical area, and compare each statistic to the same statistic computed for that bin or set of bins over a large area to identify deviations, identify anomalies, and distinguish signals from noise 705. Bin-by-bin processing may be performed using the average, median, maximum, minimum, standard deviation, variance, skew, kurtosis, and/or other statistical values over a number of transform-domain samples, to reduce the quantity of data in results and expedite processing 706. The number of transform-domain samples in use may be adjusted to increase or decrease time resolution as needed and thereby aid in signal detection 707. Bins may be combined as needed, using a maximum value search or statistical measure to reduce quantity while also detecting the presence of signals 708. Transform-domain samples may also be combined or dropped (for example, using decimation to down-sample the frequency of a signal, using fast Fourier transforms (FFTs) or other transforms, etc.), using combination over time to reduce noise and improve signal detection 709, before finally outputting data for further handling. Although this exemplary bin-wise processing algorithm has been described using particular set of steps in a particular order, it is worth noting that not all steps may need to be used, and the particular order of steps given in this example may not be required, to produce acceptable results, depending on the results required and the nature and quality of the data being processed.

FIG. 8 is a flow diagram illustrating an exemplary algorithm for a Rayleigh distribution analysis 800, according to an aspect of an embodiment. According to the aspect, signals may be detected and classified by finding the Rayleigh distribution of in-phase and quadrature-phase samples 801, comparing the Rayleigh distribution of signals over a frequency band of interest against noise distribution 802, and applying thresholds to isolate signals 803. As with other techniques herein, thresholds may be developed and refined using machine learning and training datasets, improving operation through the application of statistical techniques. According to the "central limit theorem", a sufficiently large sum of sinusoidal signals will have a distribution that converges around Gaussian noise, and in practice a small number of equal-amplitude signals still retain a distinguishable Kurtosis and thus may be isolate using trained thresholds.

FIG. 9 is a flow diagram illustrating an exemplary algorithm for telecommunication signal classification 900, according to an aspect of an embodiment. This technique may be used to detect, identify, and classify telecommunication signals using image processing techniques in the frequency-domain and/or time-frequency domain. Image processing algorithms may be used in multiple frequency and time resolutions to produce compact datasets 901. These compact datasets may be used as training datasets to train machine learning algorithms to detect, identify, and classify telecommunication signals 902. For example, a 10 MHz LTE signal can be used as training data to refine a model for detection of 10 MHz (or larger) signals in live data. Training may utilize multiple different resolutions for either or both the time and frequency domains, for example to produce more training data from fewer data sets by narrowing the frequency resolution and using smaller portions of bandwidth for each sample. This training may be used to apply machine learning to future datasets in live signal data 903, for example to refine thresholds for other algorithms described herein and to improve signal processing results. Input to a machine learning algorithm may also include features specific to the signal type such as an LTE synchronization symbol based on any one or combination of the primary or secondary synchronization signals or reference signals from one or more antenna ports, or demodulated information block messages. Similarly, other wireless signals may be synchronized or partially demodulated to derive additional features.

FIG. 10 is a flow diagram illustrating an exemplary algorithm for receiver anomaly detection 1000, according to an aspect of an embodiment. When a telecommunication signal is received from a given receiver, the Kurtosis value may be calculated using only the amplitude value of the signal (and not complex values) 1001. This Kurtosis value may then be compared to subsequent signals in question 1002 from the same receiver, and thresholds may be applied to determine whether the signal in question is an artifact of the sensor hardware (i.e., an anomaly) and should be discarded 1003. These thresholds may be refined using machine learning techniques, as described elsewhere. This algorithm may be used to detect spurious signals, aliased signals, and/or signals that are saturating a receiver without contributing additional useful data. Such anomalous signals may be discarded in order to reduce sensor load and improve operations on radio frequency signals, thereby reducing the total amount of data to be processed and cleaning up datasets that are used for various techniques described herein 1004.

FIG. 11 is a flow diagram illustrating an exemplary algorithm for transmitter density estimation 1100, according to an aspect of an embodiment. Depending on the geographical resolution, area covered by each sample (or filled-in sample data from interpolation), or transmitter density, estimating the locations of transmitters may not always be feasible. In these cases, density may be estimated rather than precise locations for transmitters in a given geographical area of interest. In an initial step 1101, measured signal strength data may be received for one or more frequency bands, for example for a specific frequency or group of frequencies, or for interpolated frequency data, and mapped across a geographical area. This mapping may occur regardless of whether there is any information available on transmitter locations. Next, a portion of the geographical area in question may be surveyed 1102, and the number of transmitters in the surveyed area may be counted 1103. The transmitter numbers (and optionally any other observed information such as transmitter types or antenna configurations) may then be correlated with the measured signal strength data 1104, producing a measurement of transmitters-per-signal strength per frequency or group of frequencies. This may then be applied to the remaining (and presumably low-resolution) geographical area 1105 to estimate the transmitter density based on the measured signal strength data.

FIG. 12 is a flow diagram illustrating an exemplary algorithm for transmitter detection and location 1200, according to an aspect of an embodiment. The first step is to examine multiple signal samples taken from different times or look angles at a given frequency or frequencies 1201. Samples may then be examined across multiple frequencies or groups of frequencies 1202, and signals may be correlated in a given geographical area to determine whether a transmitter location has been identified 1203.

FIG. 13 is a flow diagram illustrating an exemplary algorithm for geolocation analysis 1300, according to an aspect of an embodiment. When a set of signal data is received 1301, it may be analyzed using either an iterative method 1302 or a multilateration method 1303. If an initial transmitter time of transmission is known, the iterative method 1302 may be utilized to iteratively fit the timing data for the received signal dataset to the assumed transmitter location. Using the iterative method 1302, for each signal sample in the dataset, a time-of-flight is calculated for each receiving sensor or observation location. This time-of-flight information is then used to determine the range from the signal source to the receiving sensor(s). The multilateral location of the transmitter is calculated from the intersection of the range values. This iterative method 1302 utilizes signal timing information for signals, providing an advantage when multiple sensors are not available; rather than relying on multiple sensors for multilateration, a single sensor may be moved to take samples at different points in time, since the signal transmission timing is known. If the transmitter time of transmission is unknown, the multilateration method 1303 is used instead, which is an expansion of the trilateration method known in the art. In this method, the location of the signal source may be estimated by using additional measurements from the same sensor or by using additional sensors to derive differential ranges. By measuring the time-of-arrival (TOA) for each signal transmission received, and given the known location of the sensor at that time, the range may be calculated for each received signal and therefore arrive at the location of the transmitter. Capturing multiple consecutive timing signals may be used to reduce errors, particularly with weaker signals or where there is a large amount of noise or interference. The timing information can be supplemented with power, phase, and frequency information to potentially increase accuracy. What it is supplemented with (power, phase, frequency) depends on the properties of the sensor (e.g., phase differences require multiple antennas and phase-matched receive paths in the sensor hardware) and the collection platform (e.g., an aircraft or spacecraft with a sensor attached will induce a Doppler shift in frequency with respect to a stationary terrestrial transmitter). In particular in certain signal environments in which power is applied as supplemental information, the estimated error of the calculated transmitter location can be refined using the extent of the observation area and signal strength.

FIG. 14 is a flow diagram illustrating an exemplary algorithm for geolocation analysis using an alternate method 1400, according to an aspect of an embodiment. Geolocation may be determined by receiving signal information over multiple observation locations 1401 and determining the best location estimate based on highest received signal power 1402. The error associated with this estimate may be determined by examining detected signal power and the geographical extent over which the signal is observed 1403. This method of using received signal power can be applied stand-alone, or it can be used to refine timing-based methods.

Figure 15:
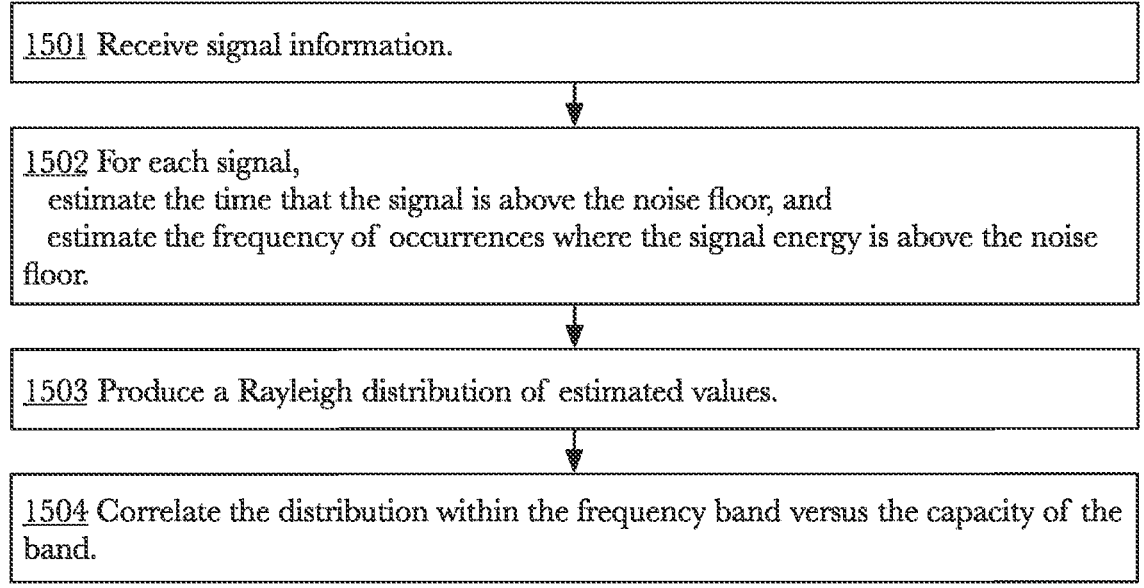
FIG. 15 is a flow diagram illustrating an exemplary algorithm for telecommunication activity estimation, according to an aspect of an embodiment.

FIG. 15 is a flow diagram illustrating an exemplary algorithm for telecommunication activity estimation 1500, according to an aspect of an embodiment. According to this technique, telecommunication activity may be estimated within a given frequency band of interest, and may then be compared against the total capacity of that band to identify overall telecommunication usage. For each signal received 1501 within a sample set, the portion of time that the signal energy level is above the noise floor may be estimated, and the frequency of instances where the energy level exceeds the noise floor may be determined 1502. Then a Rayleigh distribution of estimated values may be produced 1503, and correlated to the amount of activity in the frequency band vs. the overall communication capacity of that band 1504.

Figure 16:
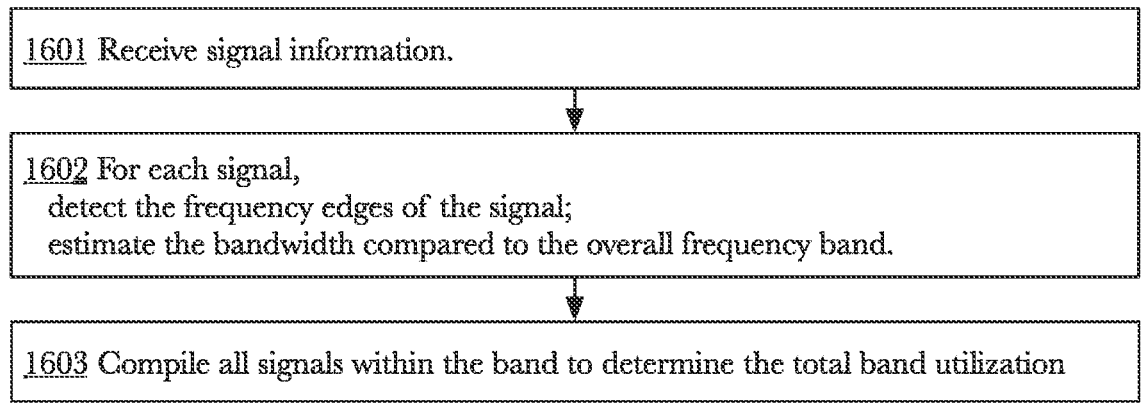
FIG. 16 is a flow diagram illustrating an exemplary algorithm for telecommunication utilization estimation, according to an aspect of an embodiment.

FIG. 16 is a flow diagram illustrating an exemplary algorithm for telecommunication utilization estimation 1600, according to an aspect of an embodiment. According to this technique, the portion of a given frequency band that is being used vs. the total bandwidth may be estimated, by detecting signals that occupy parts of a defined frequency band and estimating the bandwidth consumed out of the total bandwidth available. First, for each received signal 1601, the signal edges may be detected 1602 by estimating the mean value along the time domain to obtain a single set of data in the frequency domain, and then calculating the gradient. A large magnitude in the gradient indicates the edge of a signal in the frequency domain, so by applying a threshold value edges may be determined for each signal. The bandwidth used by the signal is estimated compared to the overall frequency band 1602, and then the estimated bandwidth of all signals within the band may be compiled to determine the overall bandwidth utilization 1603.

FIG. 17 is a flow diagram illustrating an exemplary algorithm for frequency utilization estimation 1700, according to an aspect of an embodiment. Frequency utilization may be estimated using two methods. The first method 1701 is used where a frequency band has been defined. According to the first method 1701, machine learning algorithms are used to identify clustering of frequencies. The second method 1702 is used where a frequency band has not been defined. according to the second method 1702, a convolutional filter is tuned in time and frequency characteristics to a specific signal type. The filter is convolved over a large time-frequency space, using peaks of the result to identify a signal or signals of interest, from which utilization over the larger frequency can be estimated.

Figure 18:
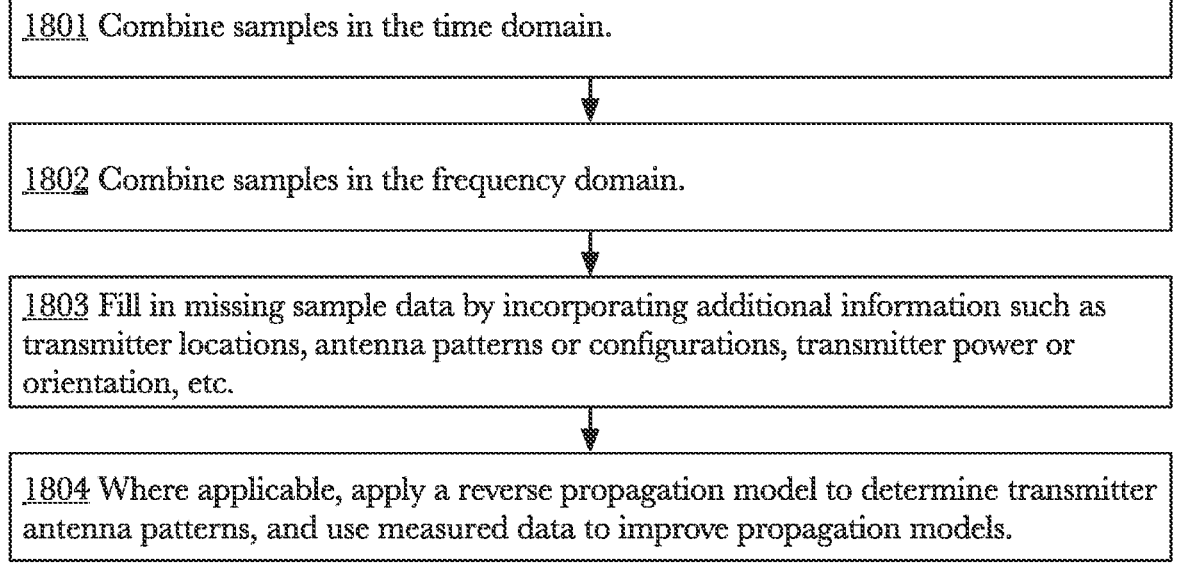
FIG. 18 is a flow diagram illustrating an exemplary algorithm for sample data interpolation, according to an aspect of an embodiment.

FIG. 18 is a flow diagram illustrating an exemplary algorithm 1800 for sample data interpolation, according to an aspect of an embodiment. Data interpolation is used to fill in gaps in data by combining samples in the time and frequency domains. In the time domain, a variety of factors such as system sample rate, sweep rate, instantaneous bandwidth, platform speed or dynamics (such as altitude or angle changes), or spatial Nyquist sampling, samples may be combined to identify and fill in gaps 1801. Algorithms used to combine the samples may include, but are not limited to, combining data by finding the mean, median, maximum, minimum, variance, skew, and kurtosis for the amplitude, or log of the amplitude, power, or Kurtosis across a period of time. For a moving platform, such as a satellite, aircraft, or other vehicle-mounted sensor, the spatial Nyquist sampling criterion may be taken into consideration as well. Samples may also be combined in the frequency domain 1802, including samples in frequency bins that may not necessarily be adjacent but may be meaningful when combined (for example, frequencies that are related by allocation, such as non-adjacent frequency bands used by the sample mobile network operator). Once the samples are combined, missing data may be filled in by incorporating additional information transmitter location, antenna pattern or configuration, or transmitter power or orientation 1803. For example, a mobile sensor may follow a programmed route (such as a flight path for an aircraft or satellite), but the sensor data may have gaps between route segments. Interpolation may be used to fill in these gaps with additional data, for example using techniques such as in-painting or kriging. Results may be improved through incorporation of transmitter location information, for example using techniques described above or using known (for example, fixed) transmitter locations. This data may then be compared to the data collected by the mobile sensor along its route, filling in gaps where possible. When multiple data points are available already, reverse propagation may be used 1804 to determine missing antenna or transmitter configuration information. Extending this concept, when multiple measured data points are available, this information can be applied to inform and improve propagation modeling 1804.

Computer Architecture

Generally, the techniques disclosed herein may be implemented on hardware or a combination of software and hardware. For example, they may be implemented in an operating system kernel, in a separate user process, in a library package bound into network applications, on a specially constructed machine, on a field programmable gate array (FPGA), on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computing device, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

In other cases, purpose-built computing devices designed to perform specific functions may be used. In some cases, the purpose-built computing devices may comprise application-specific integrated circuits, field programmable gate arrays (FPGAs), or any other combination of hardware and software that may be built or programmed for a particular purpose. This is particularly the case where high speed or real time performance is required, or where limitations are placed on physical size, memory capacity, processor speed due to space constraints, budgetary constraints, and the like. Such purpose-built computing devices may be embedded into other devices (where they are often called "embedded systems").

Figure 19:
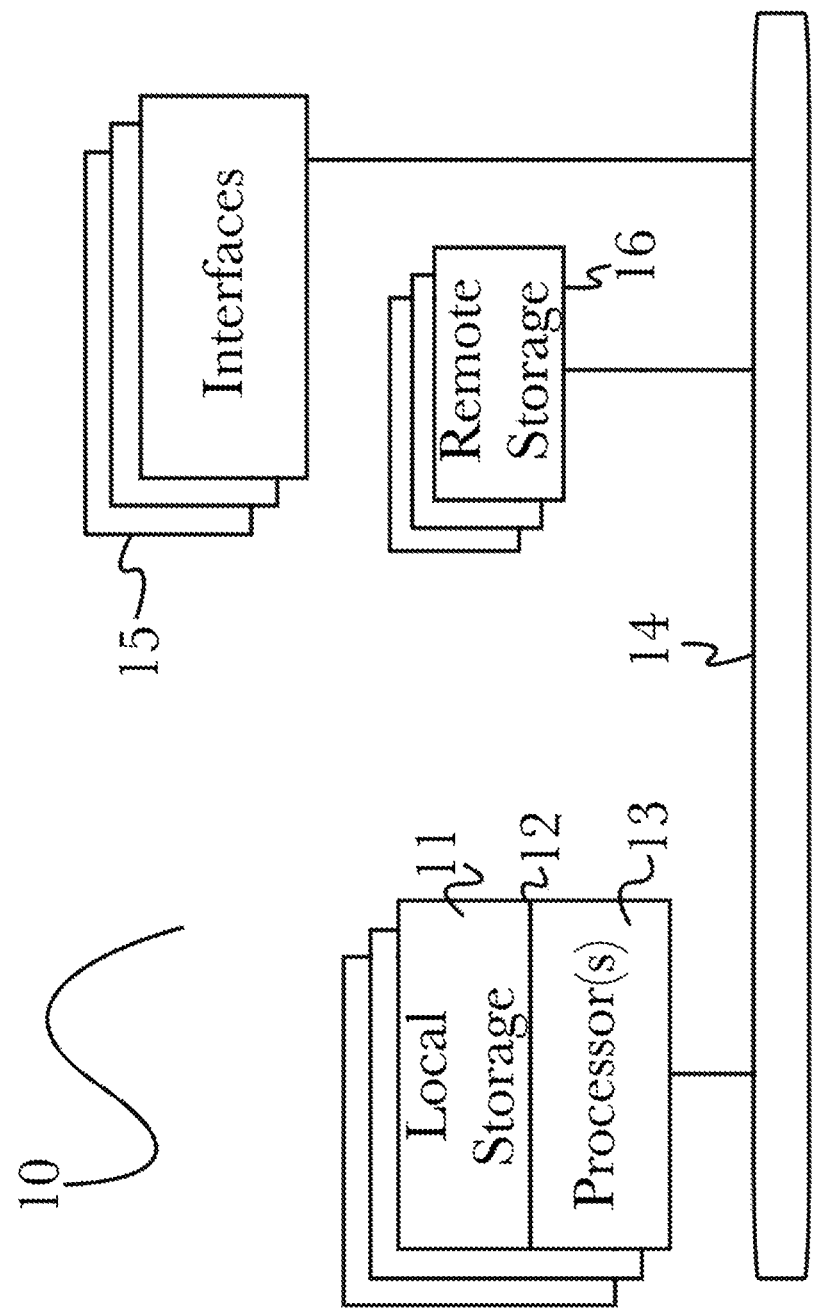
FIG. 19 is a block diagram illustrating an exemplary hardware architecture of a computing device.

Referring now to FIG. 19, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors or microcontrollers or digital signal processors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency, BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 19 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 20:
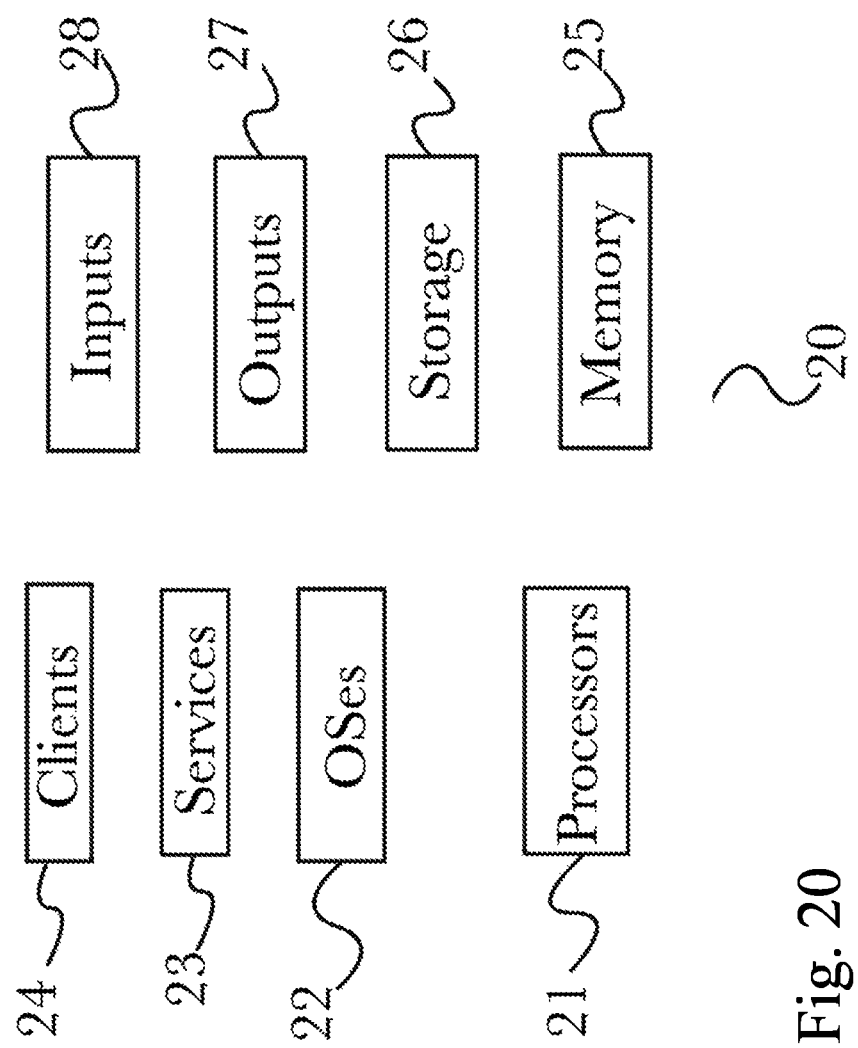
FIG. 20 is a block diagram illustrating an exemplary logical architecture for a client device.

In some aspects, systems may be implemented on a standalone computing system. Referring now to FIG. 20, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 19). Examples of storage devices 26 include flash memory, magnetic hard drive, CD-ROM, and/or the like.

Figure 21:
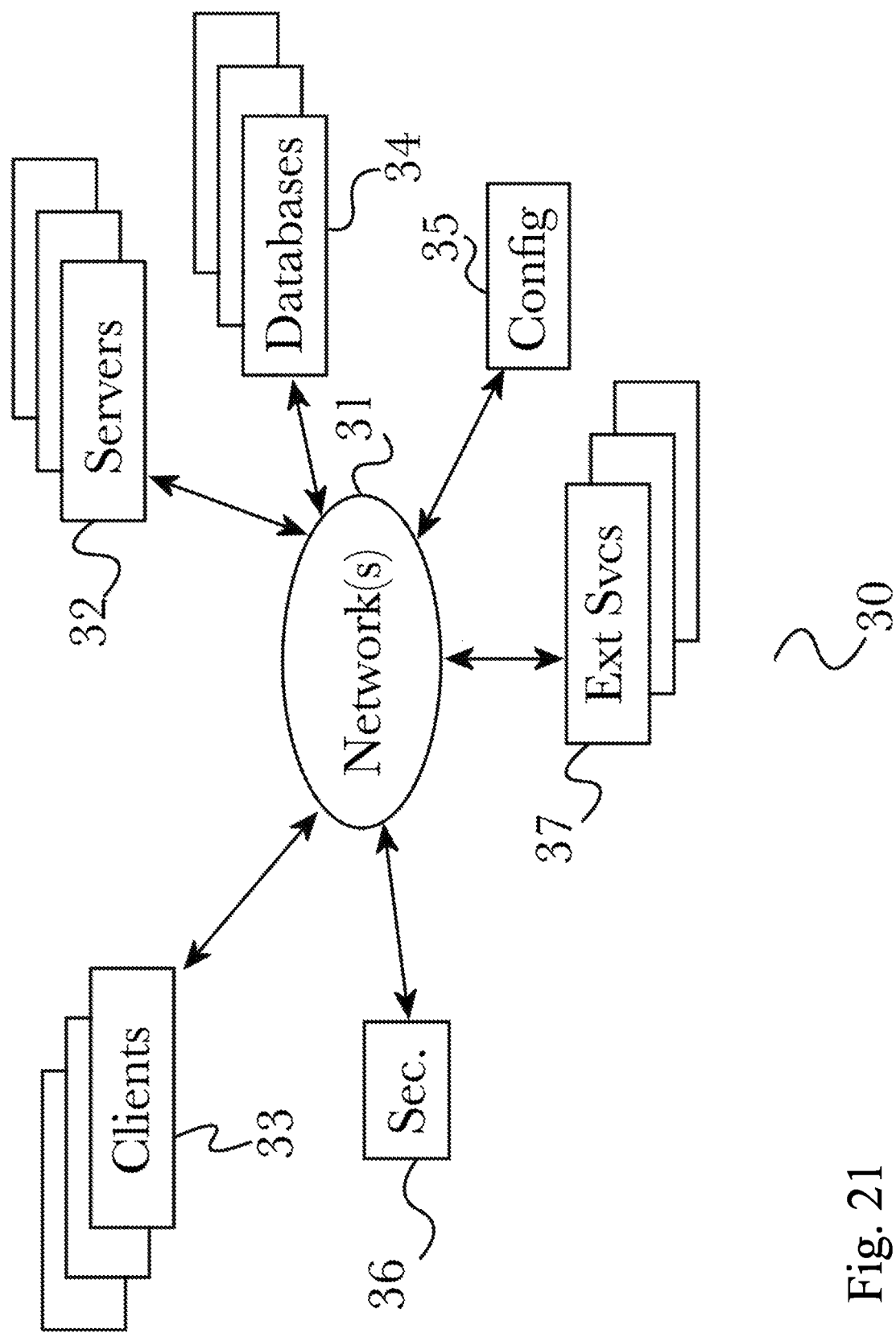
FIG. 21 is a block diagram showing an exemplary architectural arrangement of clients, servers, and external services.

In some aspects, systems may be implemented on a distributed computing network, such as one having any number of clients and/or servers. Referring now to FIG. 21, there is shown a block diagram depicting an exemplary architecture 30 for implementing at least a portion of a system according to an aspect of an embodiment on a distributed computing network. According to the aspect, any number of clients 33 may be provided. Each client 33 may run software for implementing client-side portions of a system; clients may comprise a system 20 such as that illustrated in FIG. 20. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system or approach is specifically required by the description of any specific aspect.

Figure 22:
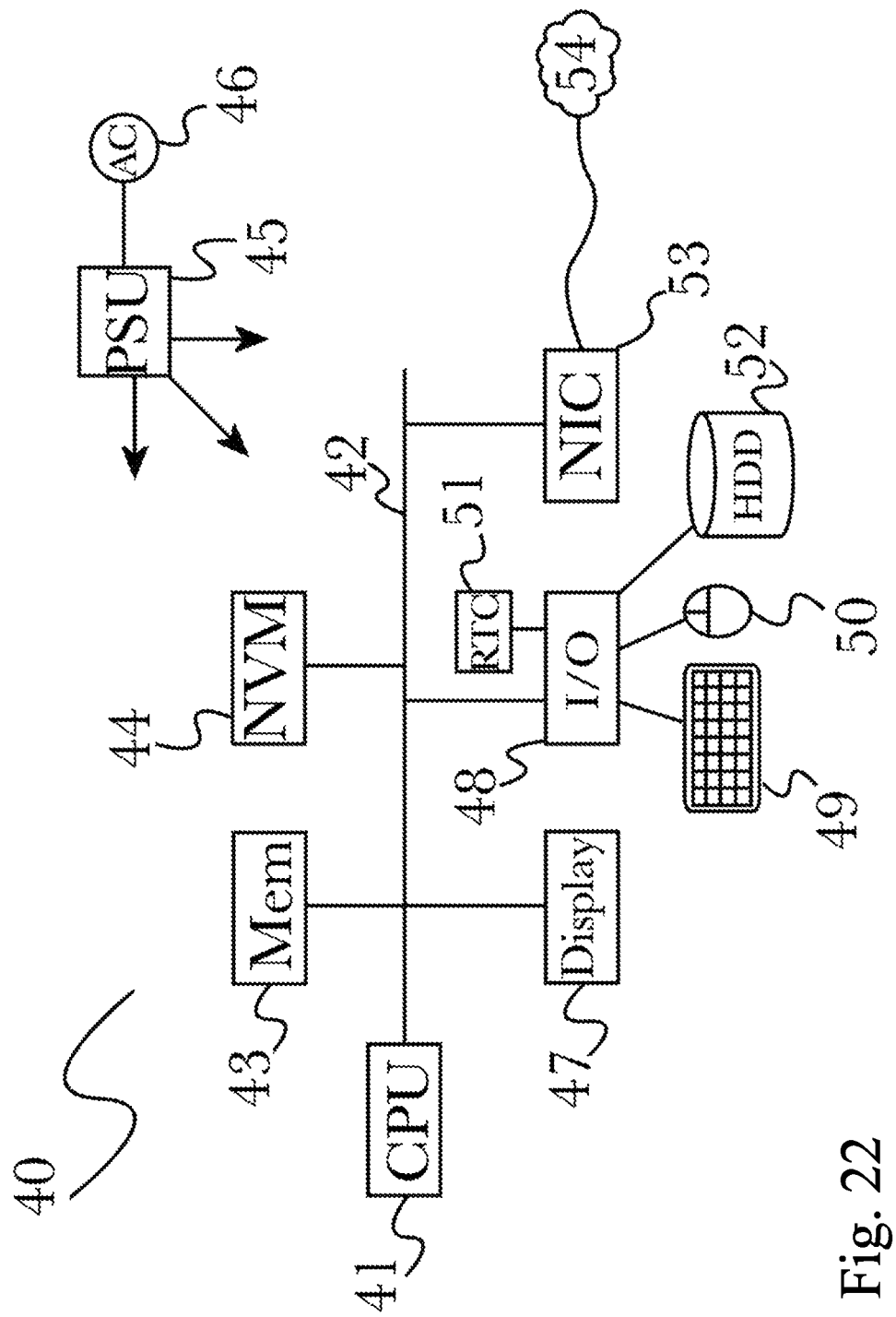
FIG. 22 is another block diagram illustrating an exemplary hardware architecture of a computing device.

FIG. 22 shows an exemplary overview of a computing device 40 as may be used in any of the various locations throughout the system. It is exemplary of any computer that may execute code to process data. Various modifications and changes may be made to computing device 40 without departing from the broader scope of the system disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computing devices such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A method for detecting, quantifying the activity of, and identifying the type of telecommunication signals, comprising:

receiving signal information;

determining, from the signal information, distribution of power samples within a frequency band of interest;

distinguishing the power samples from noise by statistical comparisons using bin-wise processing;

determining if a signal is present by applying thresholds to isolate signals;

for each signal, estimating a time that the signal is above a threshold;

estimating frequency of occurrences where the signal energy is above the threshold, or both;

determining a Rayleigh distribution of estimated times and the estimated frequency of occurrences;

correlating the Rayleigh distribution within a frequency band versus a capacity of the frequency band to determine prevalence of telecommunication activity; and using a machine learning algorithm applied to the correlation to identify the presence of known signal types within a frequency range.

2. The method of claim 1, wherein the machine learning algorithm is applied to time-frequency domain data to identify the presence of known signal types within the frequency range.

3. The method of claim 1, wherein the machine learning algorithm is applied to bin-wise statistics to identify the presence of known signal types within the frequency range.

4. The method of claim 1, further comprising refining the thresholds.

5. The method of claim 1, further comprising training the machine learning algorithms to reduce the frequency band.

6. The method of claim 1, further comprising comparing the telecommunication activity against a total capacity of the frequency band to identify overall telecommunication usage.

7. A non-transitory computer-readable medium that stores a set of instructions which when executed perform a method executed by the set of instructions comprising:

receiving signal information;

determining, from the signal information, distribution of power samples within a frequency band of interest;

distinguishing the power samples from noise by statistical comparisons using bin-wise processing;

determining if a signal is present by applying thresholds to isolate signals;

estimating, for each signal, a time that the signal is above a threshold;

estimating frequency of occurrences where the signal is above the threshold;

determining a Rayleigh distribution of estimated times and the estimated frequency of occurrences;

correlating the Rayleigh distribution within a frequency band versus a capacity of the frequency band to determine prevalence of telecommunication activity; and using a machine learning algorithm applied to the correlation to identify the presence of known signal types within a frequency range.

8. The non-transitory computer-readable medium of claim 7, further comprising training the machine learning algorithm to refine the thresholds.

9. The non-transitory computer-readable medium of claim 7, further comprising training the machine learning algorithm to reduce the frequency band of interest.

10. The non-transitory computer-readable medium of claim 7, further comprising comparing the telecommunication activity against a total capacity of the frequency band to identify overall telecommunication usage.

11. A system comprising:

a memory storage; and a processing unit, the processing unit disposed in a station and coupled to the memory storage, wherein the processing unit is operative to receive signal information;

determine, from the signal information, distribution of power samples within a frequency band of interest;

distinguish the power samples from noise by statistical comparisons using bin-wise processing;

determine if a signal is present by applying thresholds to isolate signals;

estimate, for each signal, a time that the signal is above a threshold;

estimate frequency of occurrences where the signal is above the threshold;

determine a Rayleigh distribution of estimated times and the estimated frequency of occurrences;

correlate the Rayleigh distribution within a frequency band versus a capacity of the frequency band to determine prevalence of telecommunication activity; and use a machine learning algorithm applied to the correlation to identify the presence of known signal types within a frequency range.

12. The system of claim 11, wherein the processing unit is further operative to train the machine learning algorithms to refine the thresholds.

13. The system of claim 11, wherein the processing unit is further operative to train the machine learning algorithms to reduce the frequency band of interest.

14. The system of claim 11, wherein the processing unit is further operative to compare the telecommunication activity against a total capacity of the frequency band to identify overall telecommunication usage.

* * * * *